2 Sheets—Sheet 1.

J. M. GALT.
Smut and Brush Machine for Cleaning Grain.

No. 216,391. Patented June 10, 1879.

2 Sheets—Sheet 2.

J. M. GALT.
Smut and Brush-Machine for Cleaning Grain.

No. 216,391. Patented June 10, 1879.

Witnesses:
P. C. Dieterich
Frank H. Duffy

Inventor
John M. Galt
per Manahan & Ward, Attorneys.

UNITED STATES PATENT OFFICE.

JOHN M. GALT, OF STERLING, ILLINOIS.

IMPROVEMENT IN SMUT AND BRUSH MACHINES FOR CLEANING GRAIN.

Specification forming part of Letters Patent No. 216,391, dated June 10, 1879; application filed March 14, 1879.

*To all whom it may concern:*

Be it known that I, JOHN M. GALT, of the city of Sterling, in the county of Whiteside and State of Illinois, have invented certain new and useful Improvements in Smut and Brush Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to provide a combined smut and brush machine, so as to contain in one machine an improved apparatus to remove the smut, and also to scour and polish the grain.

Figure 1:
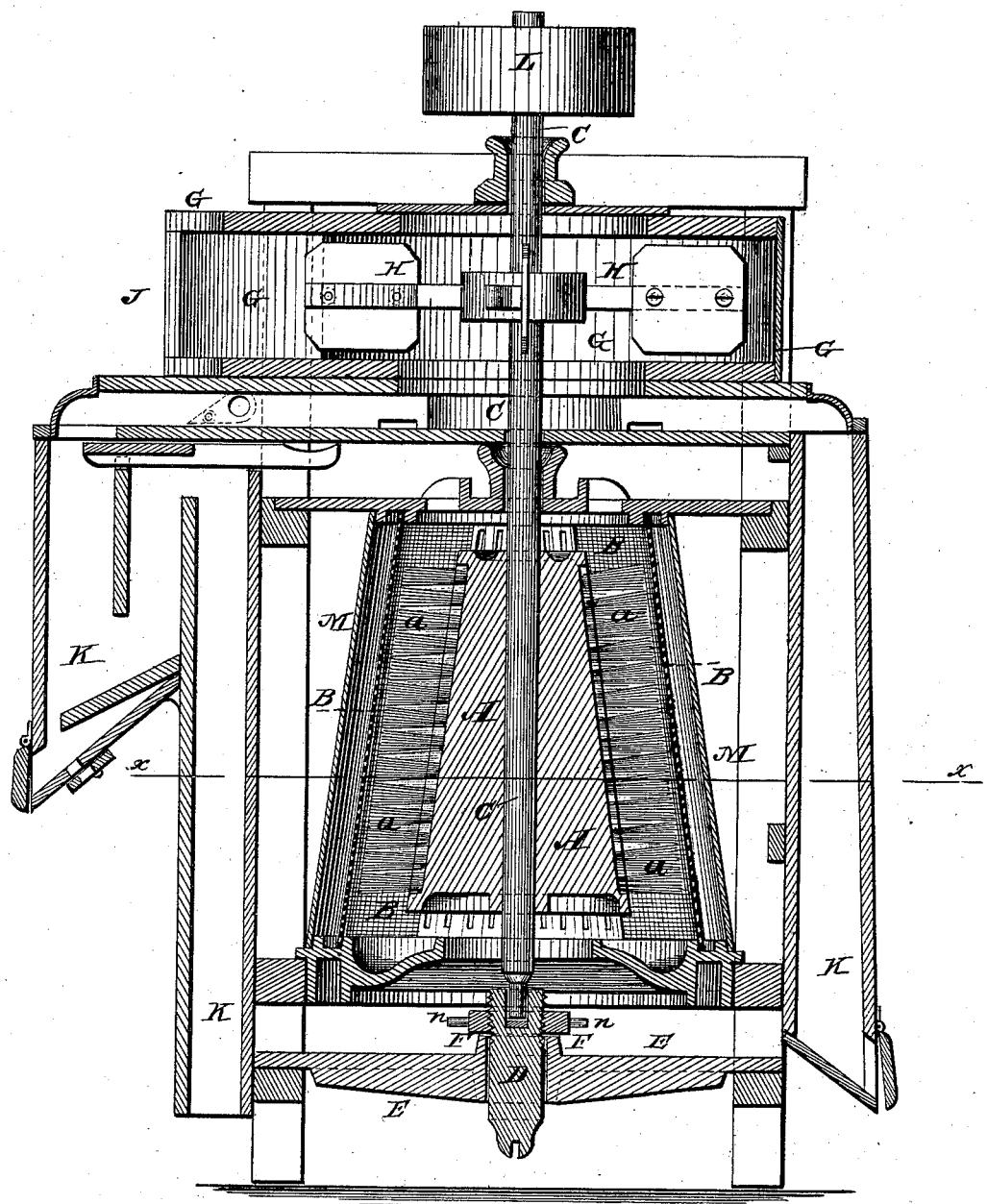
Figure 2:
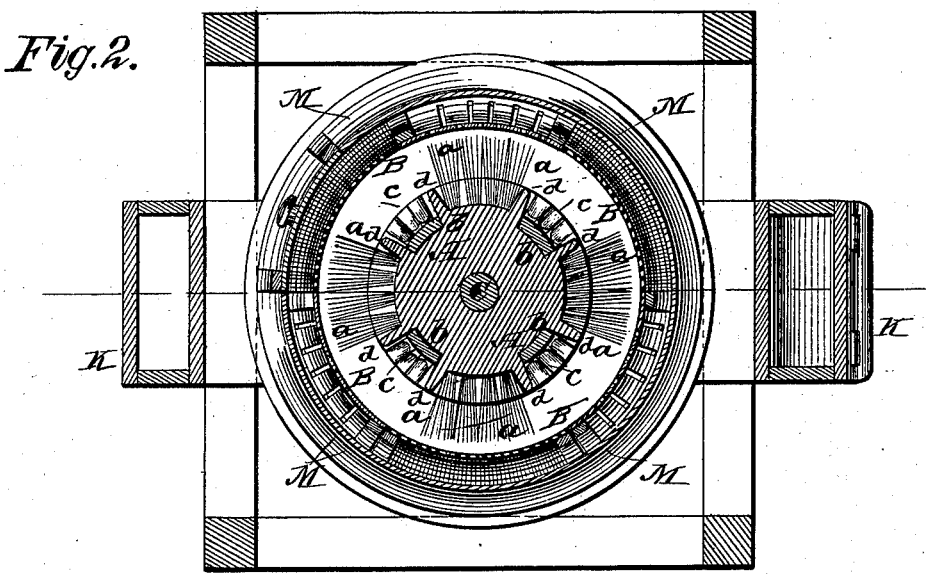
Figure 3:
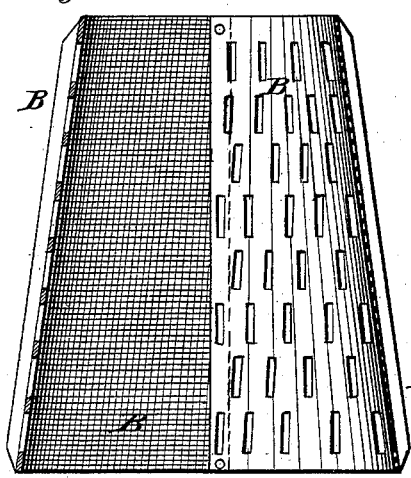
Figure 4:
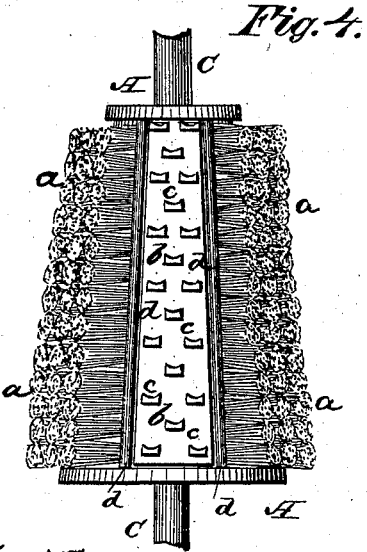
Figure 5:
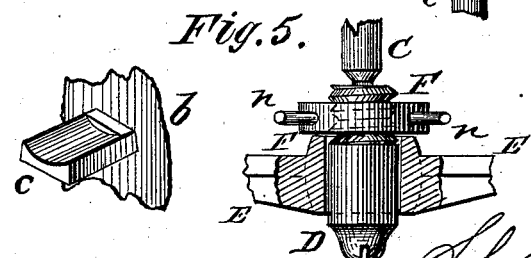

Figure 1 is a vertical section of a machine embodying my invention. Fig. 2 is a transverse section of the same on the line $x\ x$ of Fig. 1. Fig. 3 shows four vertical sections of the scouring-case B. Fig. 4 is a side elevation of the inner revolving cone, A. Fig. 5 is an enlarged view of the teeth $c$ and a vertical section of the bridge-pot D and threaded ring F.

A is a revolving cone, being constructed on its outer circumference of alternate brush and metal vertical sections. The brush-sections $a$ constitute about two-thirds of the cone-surface, (but I do not limit myself to any particular proportion,) and present the usual exterior surface. On the metallic sections $b$, I form outwardly-extending projections or teeth $c$, arranged relatively so as to cover the vertical intervals between each other, so that the grain cannot pass vertically through such teeth. The teeth $c$ project nearly or quite to the line of the outer surface of the brush-sections $a$, and have their longer diameters horizontally. The upper surface of the teeth $c$ is formed concave the full length of the teeth. The function of the teeth $c$ is to break the smut-balls and other impurities in the grain, so that such smut and impurities may be blown or drawn out by the fan.

The purpose in the above-described peculiar construction and arrangement of the teeth $c$ is to prevent the grain, as much as possible, from falling while passing through the teeth. The line of direction of the grain over the brush-sections is spirally downward, and when it strikes the teeth $c$, by reason of the concavity in the upper surface of the latter, it is thrown diagonally upward to the adjacent brush-sections, thus continuing its action on the grain, and preventing it from falling to the bottom of the cone as long as practicable. The grain passes from the teeth-sections to the brush-sections, and the operation of the latter is to scour and polish the grain, thus removing from the crease and surface of the berry all adhering dirt and smut.

On both sides of each tooth-section are formed outward flanges $d$, which are intended to extend out nearly or quite to the outer surface of the contiguous brush-sections. The purpose in such flanges is to deliver the grain on the outer surface of the brush-sections, and thus protect the sides of the brush-sections from abrasion by the action of the grain.

The cone A may be revolved in either direction by means of the pulley L, placed on the shaft C either above or below the cone. This is a very essential feature, inasmuch as in some mills the connecting machinery requires the brush to revolve in one direction, while different conditions in other mills require its revolution in the opposite direction, the respective directions being known in the art as "with the sun" and "against the sun."

B is the inner or scouring case, shaped conformably to the cone A, and is constructed of alternate vertical sections of woven steel wire and sheet-metal sections having vertical slots, as shown, such sections being bolted together laterally.

In the operation of scouring and cleaning the grain the latter passes between the outer surface of the revolving cone A and the inner surface of the scouring-case B. Neither the meshes in the wire sections nor the slots in the sheet-metal sections are sufficiently large to permit the escape of the grain. The design in constructing the scouring-case B of such alternate sections is to provide a resisting-surface to the revolving cone which shall not be as harsh as a continuous wire surface, and shall be more harsh than a continuous sheet-metal surface, but which in operation shall be a mean between that of both surfaces.

C is a vertical shaft, to which the cone A is attached, and which is stepped in the bridge-pot D, the latter being seated in the bridge-tree E.

As the revolving cone A in use becomes worn on the outer circumference of its brush-sections, the interval between such sections and the case B becomes too great for proper effectiveness. To overcome such difficulty and reduce such interval, I provide a vertical adjustment by placing the threaded ring F, having short spokes $n$, on the upper side of the bridge-tree E, around the bridge-pot D, and cutting a corresponding thread on the exterior of the upper part of the bridge-pot D.

The threaded ring F supports the bridge-pot, and the latter may be made of sufficient length and threaded sufficiently far, so that by turning the ring F the bridge-pot, and thereby the shaft C and cone A, may be raised far enough to compensate for all wear upon the exterior of the latter, and until the brush-sections are entirely worn away.

The metallic sections of the cone A are retired to correspond with the wearing away of the brush-sections by removing the necessary proportion of the backing or packing of such metallic sections. Such backing may consist of thin boards, layers of leather, or other suitable material, through which the sections are bolted to the inner rim of the cone.

G is a fan-chamber on the shaft C, in which revolves the fan H, which, by suction, draws the dust and other impurities up the spout, and discharges the same through the opening J, in the usual way, while the grain passes out at K, as shown. Outside of the case B is placed the jacket M, which prevents the dust that escapes through the scouring-case B from getting into the room, but compels it to pass up the spout. But as all of these latter parts are well known in the art, and as I do not claim them, I deem an extended description thereof unnecessary.

The value of the opposing surfaces of the cone A and scouring-case B is not contingent upon the particular shape of such parts; but the revolving cone may be made cylindrical and the case to conform thereto.

What I claim as my invention, and desire to secure by Letters Patent, is—

In a combined smut and brush machine, and in combination with a suitable case, B, the revolving cone A, having alternate vertical staves or sections of metal and brush, as shown, when such metallic sections are provided with teeth $c$, having their upper surfaces concaved and set in such cone horizontally, whereby the grain is equally retarded, whether the cone is revolved with or against the sun, substantially as and for the purpose described.

In testimony that I claim the foregoing as my own I affix my signature in presence of two witnesses.

JOHN M. GALT.

Witnesses:
E. D. ANDRUS,
J. E. STONE.